(12) United States Patent
Hino et al.

(10) Patent No.: US 8,973,839 B2
(45) Date of Patent: Mar. 10, 2015

(54) WIRELESS TAG (71) Applicant: Fujitsu Limited, Kawasaki-shi, Kanagawa (JP)

(72) Inventors: Haruhiko Hino, Minato (JP); Takeshi Tomioka, Yokohama (JP); Noritsugu Osaki, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/852,168

(22) Filed: Mar. 28, 2013

(65) Prior Publication Data

US 2013/0306741 A1  Nov. 21, 2013

(30) Foreign Application Priority Data

May 21, 2012  (JP) .................. 2012-115964

(51) Int. Cl.
G06K 19/077 (2006.01)
G09F 3/03 (2006.01)
G06K 19/07 (2006.01)
G06K 19/073 (2006.01)

(52) U.S. Cl.
CPC ........ G06K 19/07798 (2013.01); G09F 3/0311 (2013.01); G06K 19/0723 (2013.01); G06K 19/07749 (2013.01); G06K 19/0739 (2013.01)
USPC ........................................................ 235/492

(58) Field of Classification Search
CPC .................. G06K 19/07798; G09F 3/0311
USPC ................................................ 235/492, 435
See application file for complete search history.

(56) References Cited

U.S. PATENT DOCUMENTS

| 5,508,684 | A  | * | 4/1996 | Becker ....................... 340/572.5 |
| 6,050,622 | A  |   | 4/2000 | Gustafson |
| 6,073,856 | A  | * | 6/2000 | Takahashi .................... 235/492 |
| 6,465,880 | B1 | * | 10/2002 | Dobashi et al. ............... 257/679 |
| 7,304,578 | B1 |   | 12/2007 | Sayers et al. |
| 2002/0190364 | A1 | * | 12/2002 | Dobashi et al. ............... 257/679 |
| 2004/0130500 | A1 |   | 7/2004 | Takei |
| 2005/0012616 | A1 |   | 1/2005 | Forster et al. |
| 2007/0096915 | A1 |   | 5/2007 | Forster et al. |
| 2008/0011859 | A1 | * | 1/2008 | Phillips ........................ 235/487 |
| 2008/0018477 | A1 |   | 1/2008 | Forster et al. |
| 2008/0211675 | A1 |   | 9/2008 | Forster et al. |
| 2010/0079287 | A1 |   | 4/2010 | Forster et al. |

FOREIGN PATENT DOCUMENTS

| JP | 11-321887 | 11/1999 |
| JP | 2001-13874 | 1/2001 |
| JP | 2004-265374 | 9/2004 |

(Continued)

OTHER PUBLICATIONS

Extended European Search Report issued Aug. 5, 2013 in Patent Application No. 13161692.2.

Primary Examiner — Christle I Marshall
(74) Attorney, Agent, or Firm — Oblon, Spivak, McClelland, Maier & Neustadt, L.L.P.

(57) ABSTRACT

A wireless tag includes: an antenna; an integrated circuit configured to be electrically connected to the antenna; a package configured to integrally subject the antenna and the integrated circuit to packaging; and a boundary portion configured to be located between a first portion including the integrated circuit in the package and a second portion not including the integrated circuit, wherein the boundary portion is configured so as to be more easily torn apart than a portion other than the boundary portion in the package.

14 Claims, 12 Drawing Sheets

(56) References Cited

FOREIGN PATENT DOCUMENTS

| JP | 2006-293462 | 10/2006 |
| JP | 2007-102513 | 4/2007 |
| JP | 2008-59085 | 3/2008 |
| JP | 2008-310540 | 12/2008 |
| JP | 2009-251942 | 10/2009 |
| JP | 2010-49410 | 3/2010 |
| JP | 2011-164882 | 8/2011 |

* cited by examiner

WIRELESS TAG

CROSS-REFERENCE TO RELATED APPLICATION

This application is based upon and claims the benefit of priority from the prior Japanese Patent Application No. 2012-115964 filed on May 21, 2012, the entire contents of which are incorporated herein by reference.

FIELD

A technology disclosed in the present embodiment discussed herein is related to a wireless tag.

BACKGROUND

A wireless tag such as an RFID tag, which includes an IC chip storing therein information and an antenna unit, executes transmission and reception of data with a reader/writer, owing to wireless communication utilizing an electromagnetic wave. The technique of the wireless tag is used in many fields such as the distribution of goods, commodity management, and security.

The wireless tags are attached on article serving as targets or joined thereto using strings, and used for inventory management for the articles, or the like. As an example of the application of the wireless tag, there is an ID label detecting that the ID label has been peeled from an identification target object. This ID label is used for a security application for detecting the presence or absence of the opening of packing or a container, or the like. In addition, a technique has also been proposed where a wireless tag in which a portion (feeding line) of an antenna is disconnected owing to the opening of packing or a container is used and, on the basis of whether or not it is possible to communicate with the corresponding wireless tag, the presence or absence of the opening of the packing or the container is determined. For example, these technique are disclosed in Japanese Laid-open Patent Publication No. 2001-13874 and Japanese Laid-open Patent Publication No. 2009-251942.

SUMMARY

According to an aspect of the invention, a wireless tag includes: an antenna; an integrated circuit configured to be electrically connected to the antenna; a package configured to integrally subject the antenna and the integrated circuit to packaging; and a boundary portion configured to be located between a first portion including the integrated circuit in the package and a second portion not including the integrated circuit, wherein the boundary portion is configured so as to be more easily torn apart than a portion other than the boundary portion in the package.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

When a wireless tag is used in, for example, an airplane or the like, in many cases an IC chip or an antenna unit is subjected to packaging owing to a flame-resistant resin or the like such as a PEEK material so as to secure strength, a waterproof property, and flame resistance (specified in SAE AS5678). When such a wireless tag as subjected to packaging is adopted, it may be desirable to use a tool such as shears or a knife so as to disconnect a portion (feeding line) of an antenna and reduce communication performance in the same way as the prior art.

An object of the technology disclosed in the present embodiment is to provide a wireless tag where it may be possible to easily separate a portion including an integrated circuit and it may be possible to reduce communication performance.

Figure 1:
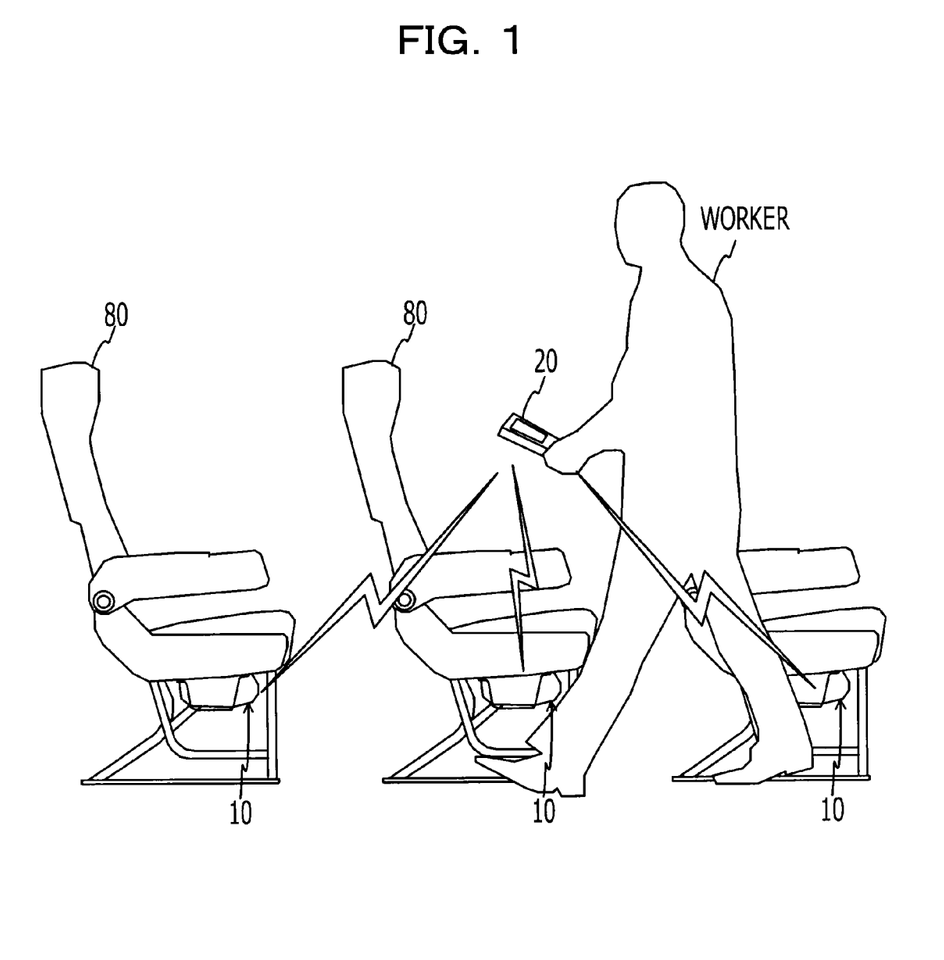
FIG. 1 is a diagram illustrating a used state of a reader/writer performing communication with a wireless tag according to an embodiment.

Hereinafter, one embodiment will be described in detail on the basis of FIG. 1 to FIG. 9. FIG. 1 is a diagram illustrating the used state of a reader/writer 20 performing communication with a wireless tag according to one embodiment. This reader/writer 20 is a terminal used by a worker performing a checkout operation within transportation such as an airplane or a ship (assumed to be the airplane in the present embodiment). The reader/writer 20 is a terminal mainly used for managing information relating to whether a storage bag 10 (in which a life jacket is stored) installed under a seat 80 exists or does not exist and is opened or unopened.

Figure 2:
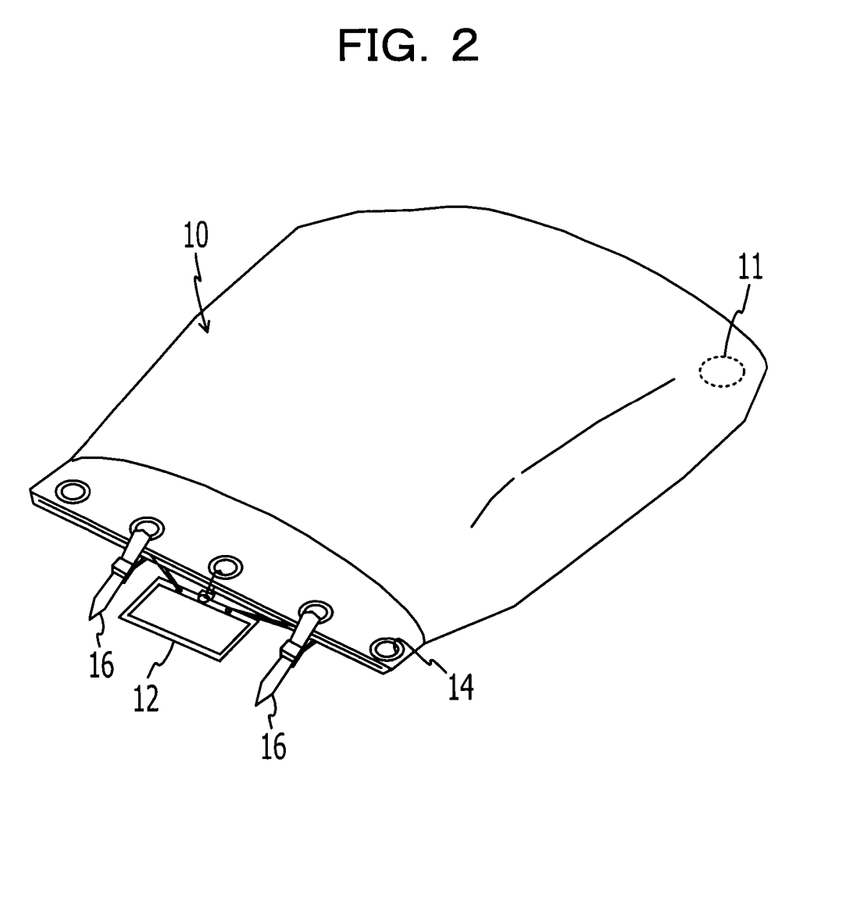
FIG. 2 is a diagram illustrating a storage bag in perspective view.

In FIG. 2, the storage bag 10 is illustrated in perspective view. The storage bag 10 is a bag for storing therewithin a life jacket, and as illustrated in FIG. 2, a plurality of string holes 14 are provided in the mouth portion thereof. When a fastening 16 is attached to a portion of the string holes 14 after a life jacket has been stored in the storage bag 10, the storage bag 10 is put into an unopened state.

In a portion of the storage bag 10, an existence confirmation wireless tag 11 is provided. The existence confirmation wireless tag 11 includes, for example, a passive type RFID tag, and rectifies a radio wave of a UHF band (for example, 920 MHz) sent out from the reader/writer 20 to obtain drive power, and performs communication with the reader/writer 20 using the corresponding drive power. Accordingly, the existence confirmation wireless tag 11 transmits the information (a tag ID and the like) of the existence confirmation wireless tag 11 to the reader/writer 20.

In addition, in the mouth portion of the storage bag 10, using the three string holes 14 (string holes 14A to 14C in FIG. 8), an opening confirmation wireless tag 12 is provided. The opening confirmation wireless tag 12 includes a passive type Radio Frequency Identification (RFID) tag, and rectifies a radio wave of a Ultra-High Frequency (UHF) band (for example, 920 MHz) sent out from the reader/writer 20 to obtain drive power, in the same way as the existence confirmation wireless tag 11, and performs communication with the reader/writer 20 using the corresponding drive power. Accordingly, the opening confirmation wireless tag 12 transmits the information (a tag ID and the like) of the opening confirmation wireless tag 12 to the reader/writer 20.

Figure 3A:
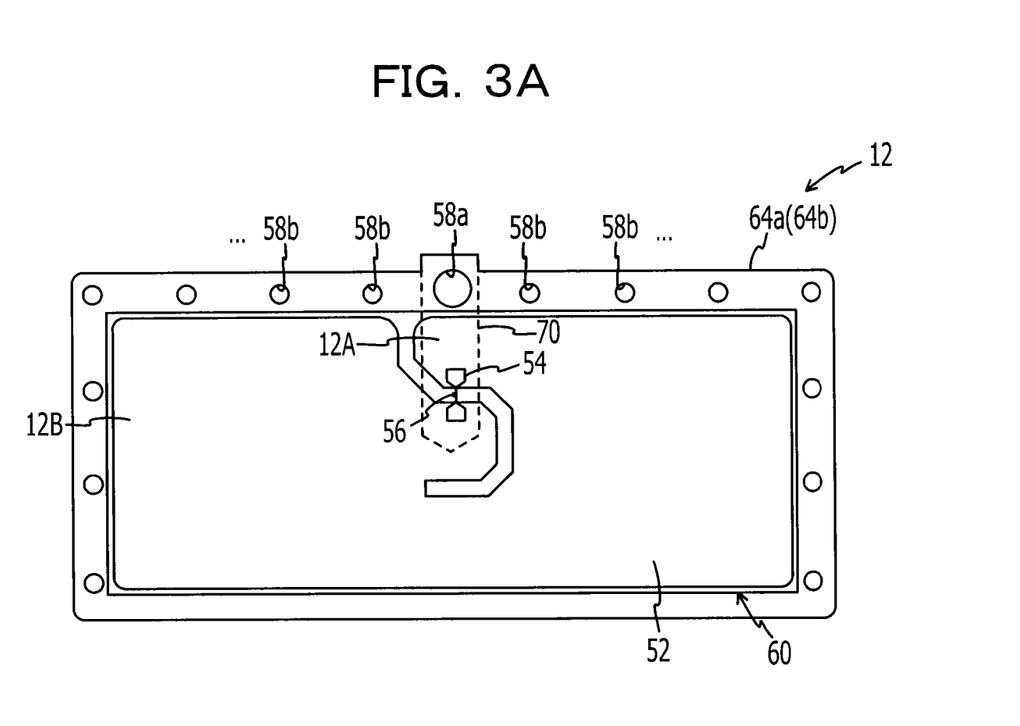
FIG. 3A is a diagram illustrating an external view of an opening confirmation wireless tag.
Figure 3B:
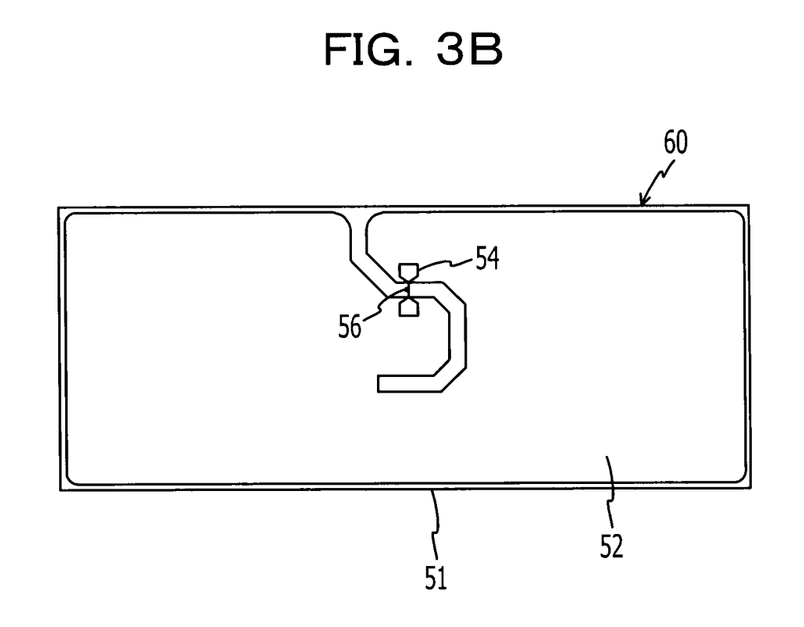
FIG. 3B is a diagram illustrating a state where an inlay included in the opening confirmation wireless tag has been ejected.

In FIG. 3A, the external view of the opening confirmation wireless tag 12 is illustrated, and in FIG. 3B, a state where an inlay 60 included in the opening confirmation wireless tag 12 has been ejected is illustrated. In addition, in FIG. 4A, the cross-section structure of the opening confirmation wireless tag 12 is schematically illustrated.

Figure 4A:
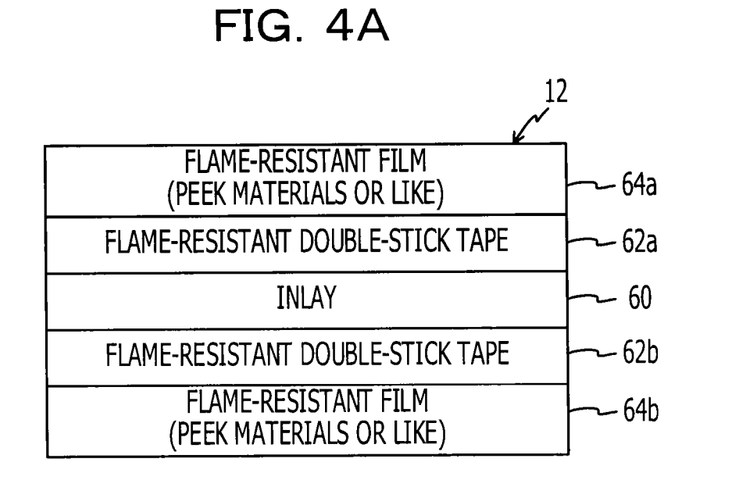
FIG. 4A is a diagram schematically illustrating a cross-section structure of an opening confirmation wireless tag.

As illustrated in these drawings, the opening confirmation wireless tag 12 includes the inlay 60 (refer to FIG. 3B) and flame-resistant films (PEEK materials or the like) 64a and 64b sandwiching therebetween the corresponding inlay 60 on both side thereof through flame-resistant double-stick tapes 62a and 62b (refer to FIG. 4A).

As illustrated in FIG. 3B, the inlay 60 includes a film 51 whose material is Polyethylene terephthalate (PET) or the like, a tag antenna 52 serving as an antenna unit, a feeding line (strap) 54, and an IC chip (RFID chip) 56 serving as an integrated circuit.

The foil of a metal such as aluminum is subjected to etching or a conductive coating material whose main component is a silver particle is printed, and hence, the tag antenna 52 is provided in the surface of the film 51. The tag antenna 52 has an approximately rectangle shape, and in the center thereof, an approximately S-shaped slit is formed. The antenna gain of the tag antenna 52 is designed so as to fall within the range of about 0.1 to 2 dBi, and the tag antenna has a shape enabling the transmission/reception of a radio wave to be performed in the vicinity of the frequency of 920 MHz. When the opening confirmation wireless tag 12 is caused to be face to face with the front face of the antenna of the reader/writer 20 and a transmission output from the reader/writer 20 is assumed to be 2 W EIRP, a communication distance between the reader/writer 20 and the opening confirmation wireless tag 12 exceeds 2 m.

The strap 54, whose material is a conductive metal such as copper, is provided so as to form a bridge in the slit in the vicinity of the central portion of the tag antenna 52. The RFID chip 56 is provided in the vicinity of the central portion of the strap 54. Accordingly, the RFID chip 56 turns out to be electrically connected to the tag antenna 52 through the strap 54. In addition, the RFID chip 56 includes a logic circuit, a memory circuit, and an analog RF circuit.

The flame-resistant films 64a and 64b are films whose materials are Polyether ether ketone, and have high heat resistance, mechanical strengths, chemical resistance, and flame resistance. In addition, the flame-resistant films 64a and 64b may correspond to a package integrally subjecting the tag antenna 52 and the RFID chip 56 to packaging.

In the flame-resistant films 64a and 64b in the vicinity of the inlay 60, as illustrated in FIG. 3A, a first through hole 58a and a plurality of second through holes 58b whose radii are smaller than the first through hole 58a are formed. These first and second through holes 58a and 58b are holes used when the opening confirmation wireless tag 12 is attached to the storage bag 10 using cable ties. In FIG. 3A, the radius of the second through hole 58b is smaller than the radius of the first through hole 58a. However, the radius of the second through hole 58b may also be equal to that of the first through hole 58a, or the radius of the first through hole 58a may also be larger.

Figure 4B:
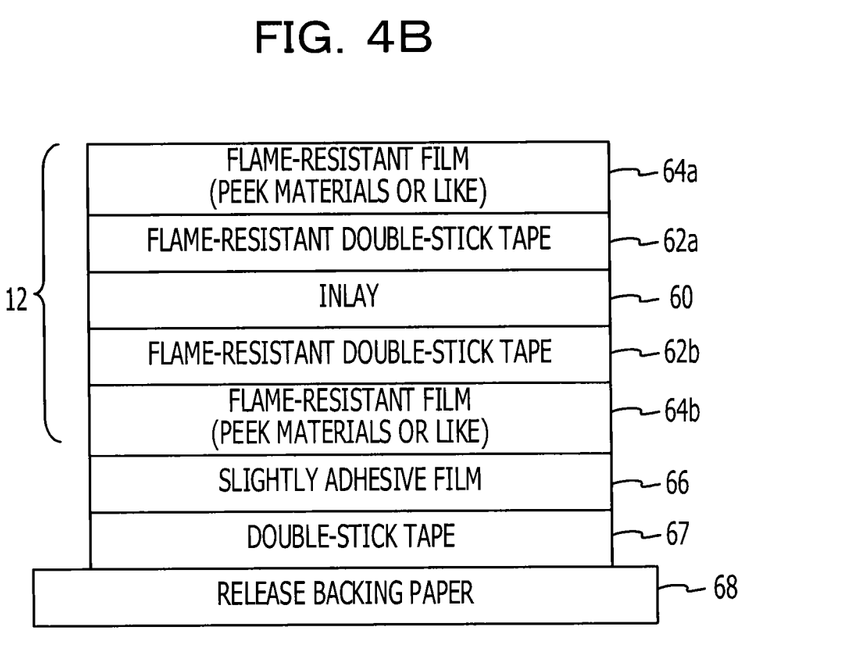
FIG. 4B is a diagram schematically illustrating a cross-section structure of the opening confirmation wireless tag attached on a release backing paper.

In addition, as illustrated in FIG. 4B, owing to the constraint of manufacturing, the opening confirmation wireless tag 12 is subjected to shipping or the like in a state of being attached on a release backing paper 68. Therefore, in the present embodiment, since the opening confirmation wireless tag 12 is attached to the storage bag 10 using cable ties, usability is not good if a double-stick tape or the like remains to adhere to a surface attached on the release backing paper 68. Therefore, in the present embodiment, by causing a double-stick tape 67 and a slightly adhesive film 66 to lie between the release backing paper 68 and the opening confirmation wireless tag 12, it may be possible to peel off the slightly adhesive film 66 and the flame-resistant film 64b from each other when the opening confirmation wireless tag 12 is peeled off from the release backing paper 68. In this case, since the double-stick tape 67 does not remain in the opening confirmation wireless tag 12, it may be possible to improve the usability of the opening confirmation wireless tag 12. The cable ties are cable ties such as, for example, wires.

Here, in a boundary portion between a first portion (a pentagonal portion) (expressed using a symbol "12A" in FIG. 3A and the like) in the opening confirmation wireless tag 12, which includes the RFID chip 56, and a second portion (expressed using a symbol "12B") other than the first portion in the opening confirmation wireless tag 12, a perforation 70 is formed that is processed so as to be more easily torn apart than the other portion. In addition, the perforation 70 is formed so as to penetrate the flame-resistant films 64a and 64b and the inlay 60.

Figure 5:
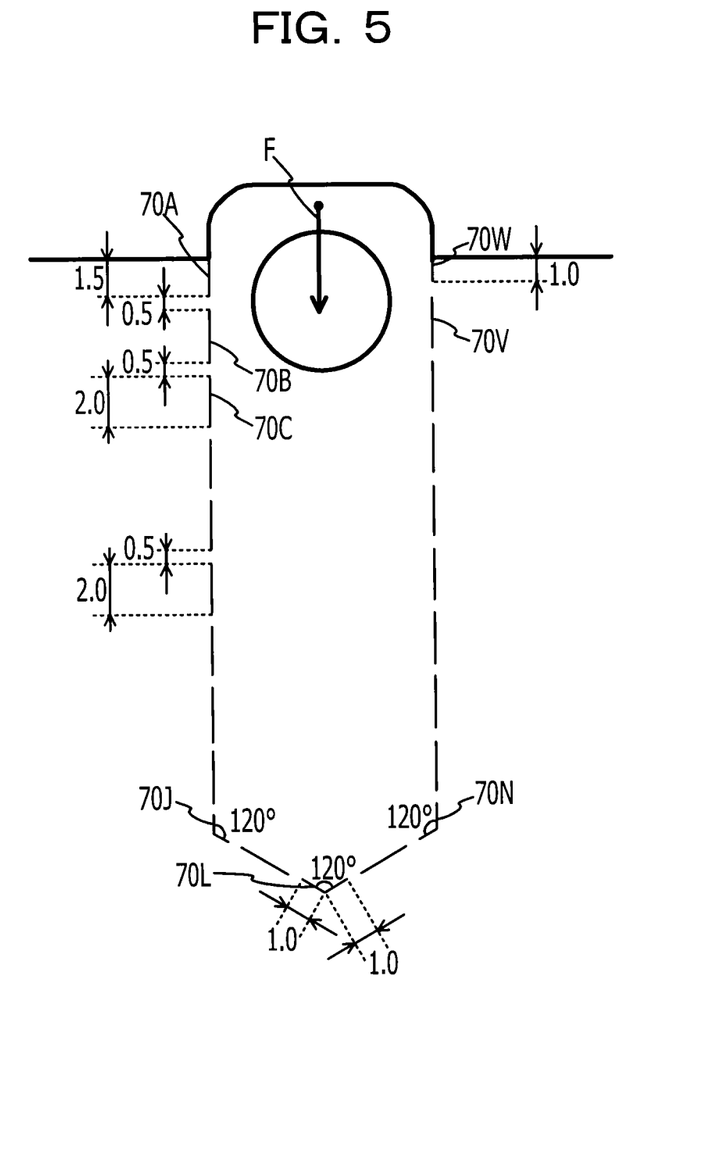
FIG. 5 is a diagram magnifying and illustrating the vicinity of a first portion of an opening confirmation wireless tag.

Hereinafter, the detail of the perforation 70 will be described on the basis of FIG. 5. FIG. 5 is a diagram magnifying and illustrating the vicinity of the first portion 12A of the opening confirmation wireless tag 12. In this regard, however, the illustration of the inlay is omitted.

As illustrated in FIG. 5, the perforation 70 includes cut portions 70A to 70W provided along two sides extending in the width direction (the up-and-down direction of the plane of paper) of the opening confirmation wireless tag 12 and two sides extending in directions intersecting with the width direction and a longitudinal direction (provided along the outer edge of the first portion 12A). The entire lengths of the cut portion 70B to 70V accounting for the majority of the cut portions 70A to 70W are set as to range from 1.0 mm to 5.0 mm (2.0 mm in FIG. 5). In addition, distances between the adjacent cut portions 70A to 70W are set as to range from 0.1 mm to 0.5 mm (0.5 mm in FIG. 5). In addition, while the range of a distance between a cut portion and a cut portion is an adequate range obtained on the basis of an experimental result due to the inventor, the corresponding adequate range fluctuates owing to the material or the like of the opening confirmation wireless tag 12.

In addition, as for the cut portions 70A and 70W, the length of the cut portion 70A is 1.5 mm from the end portions of the flame-resistant films 64a and 64b, and on the other hand, the length of the cut portion 70B is set to 1.0 mm from the end portions of the flame-resistant films 64a and 64b. In doing this way, it may be possible to displace the positions of the cut portions 70A to 70J and the positions of the cut portions 70N to 70W in a longitudinal direction within the plane of paper in FIG. 5 (it may be possible to displace the levels thereof in a horizontal direction). Accordingly, since it may be possible to avoid a balance between stresses in cut portions adjacent to each other in the horizontal direction when the first portion 12A is torn from the second portion 12B owing to a force F, it may become possible to easily separate the first portion 12A from the second portion 12B.

In addition, the cut portions 70J, 70L, and 70N have inflected shapes, and an angle formed in each of the cut portions is set to 120 degrees. Accordingly, since the force F is divided in directions along cuts in the cut portions 70J, 70L, and 70N, it may become possible to easily separate the first portion 12A from the second portion 12B (separation along cut portions).

Figure 6:
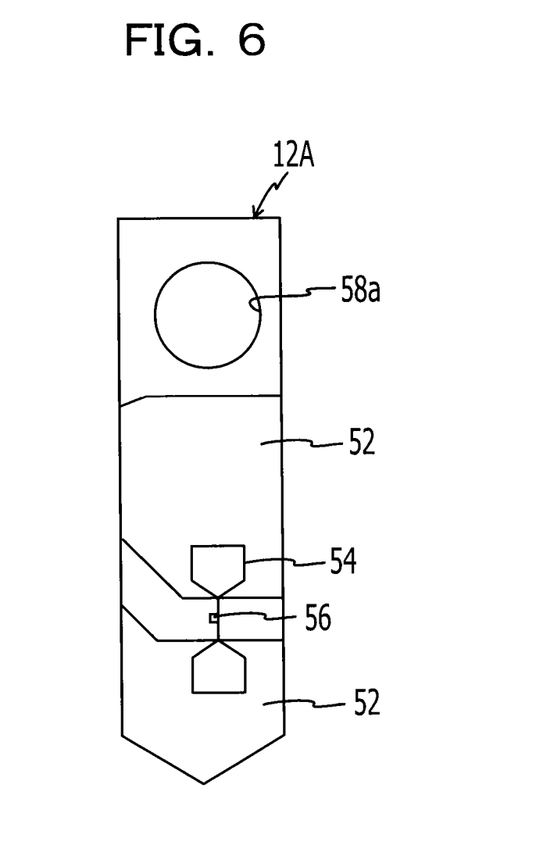
FIG. 6 is a diagram magnifying and illustrating a first portion (after separation) of an opening confirmation wireless tag.

When the first portion has been separated as described above, the tag antenna 52 remains in the first portion 12A only by, for example, a length of about 1 cm on each side of the RFID chip 56, as illustrated in FIG. 6. In this case, if the transmission output of the reader/writer 20 is 2 W EIRP, communication between the opening confirmation wireless tag 12 and the reader/writer 20 becomes disabled. In addition, even if the transmission output of the reader/writer 20 is increased to be 4 W EIRP, a communication distance between the opening confirmation wireless tag 12 and the reader/writer 20 becomes less than 10 cm, and becomes insufficient for communication from a long distance (communication in the state in FIG. 1).

Figure 7A:
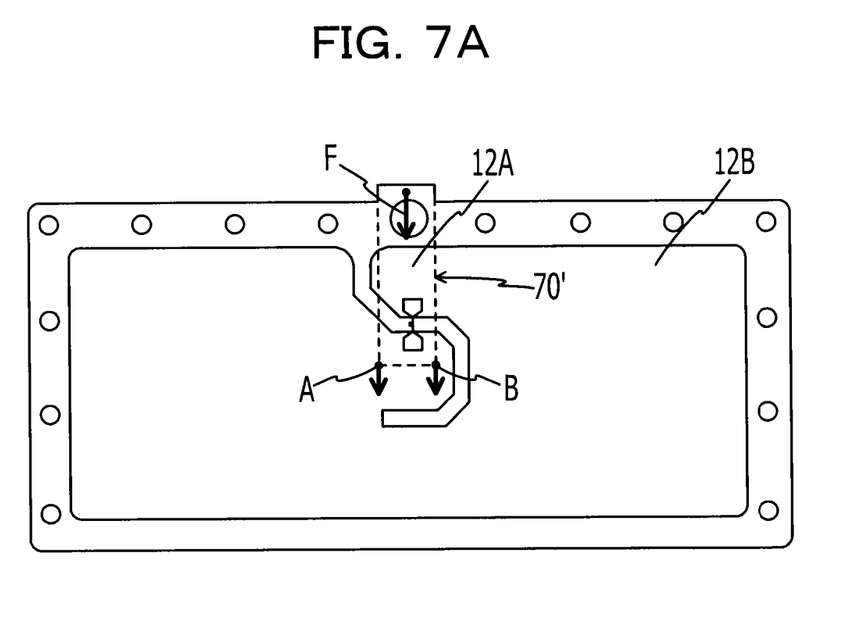
FIGS. 7A and 7B are diagrams for explaining comparative examples.
Figure 7B:
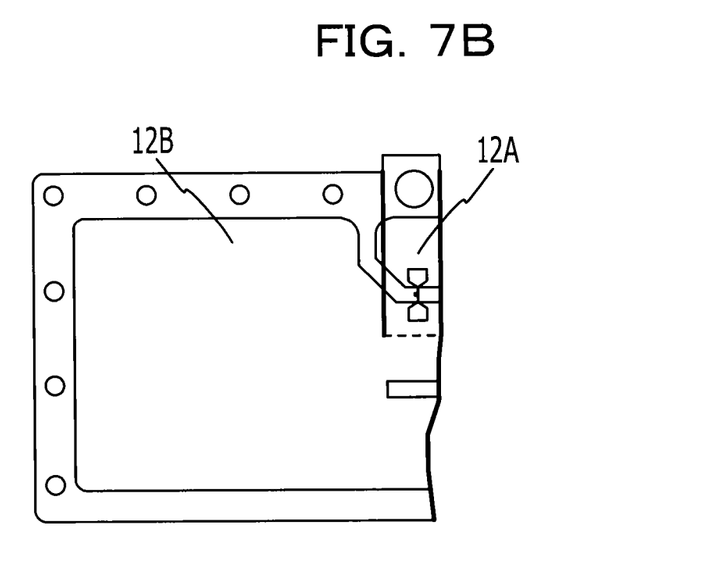

Here, in FIG. 7A, a perforation 70' as a comparative example is illustrated. The perforation 70' illustrated in FIG. 7A has an approximately rectangular shape (the angle of a corner portion is about 90 degrees). In a case where such a perforation 70' is adopted, when such a force F as illustrated in FIG. 7B is applied to the first portion 12A, the force F is not resolved in directions along cut portions, in corner portions A and B. Therefore, when the force F continues to be applied, a situation may occur where the second portion 12B is cut up as illustrated in FIG. 7B. In this case, as illustrated in FIG. 7B, since a large portion of the tag antenna 52 remains to be connected to the RFID chip 56, it may become possible to perform communication with the reader/writer 20 located at a relatively long distance.

Figure 8:
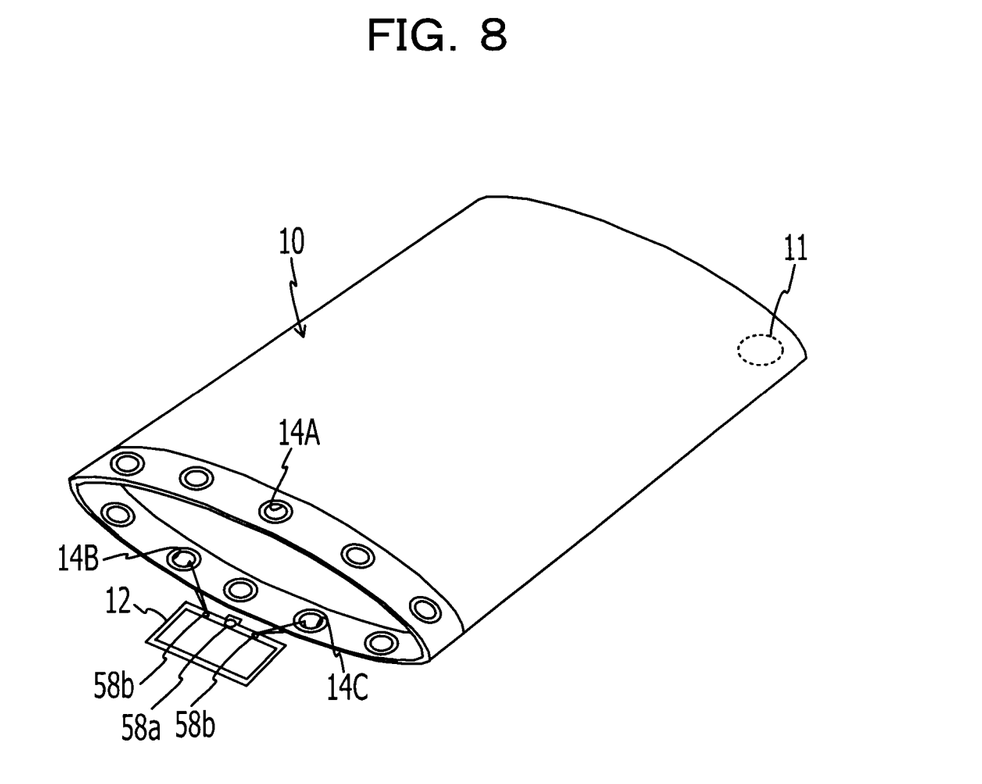
FIG. 8 is a diagram for explaining a method of mounting an opening confirmation wireless tag.

In the present embodiment, as illustrated in FIG. 8, a worker gets cable ties through the two second through holes 58b in the opening confirmation wireless tag 12 configured in such a way as described above, and gets the corresponding cable ties through the string holes 14B and 14C in the storage bag 10 to tie the cable ties. Accordingly, the worker attaches the opening confirmation wireless tag 12 to the storage bag 10. In addition, as illustrated in FIG. 2, after having closed the mouth of the storage bag 10 using the fastenings 16 (after causing the mouth of the storage bag 10 to be unopened), the worker gets a cable tie through the first through hole 58a in the opening confirmation wireless tag 12 and gets the corresponding cable tie through the string hole 14A in the storage bag 10 (refer to FIG. 8) to tie the cable tie (refer to FIG. 2).

Figure 9:
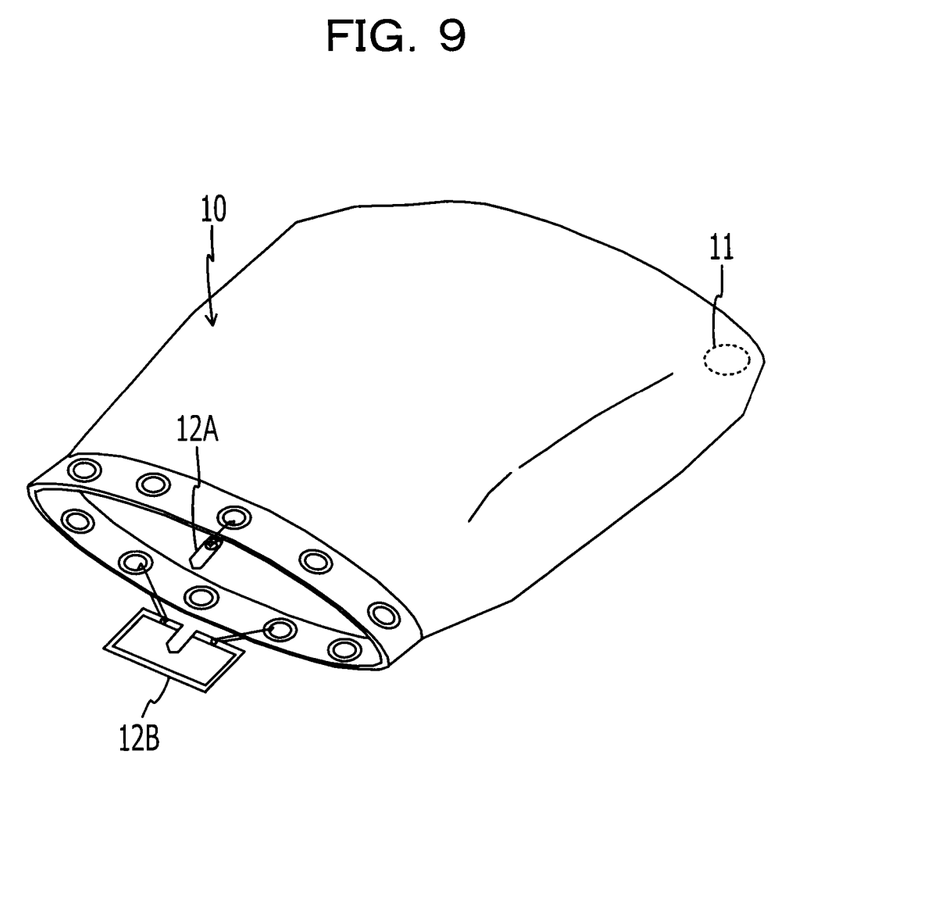
FIG. 9 is a diagram illustrating a state of an opening confirmation wireless tag after a storage bag has been opened.

In this case, when a passenger or the like on an airplane opens the storage bag 10 as illustrated in FIG. 9, the first portion 12A and the second portion 12B in the opening confirmation wireless tag 12 turn out to be separated from each other.

In the present embodiment, a worker checking life jackets moves along an aisle between seats with holding the reader/writer 20 as illustrated FIG. 1, and hence, the worker performs communication with the existence confirmation wireless tag 11 and the opening confirmation wireless tag 12 provided in the storage bag 10 of each life jacket and collets the information (the tag ID or the like) of each tag. In addition, when having been able to communicate with each of the existence confirmation wireless tag 11 and the opening confirmation wireless tag 12 provided in the storage bag 10 installed in one seat 80, the reader/writer 20 detects that the corresponding storage bag 10 exists in an unopened state under the seat 80. In addition, when having been only able to communicate with the existence confirmation wireless tag 11 from among the existence confirmation wireless tag 11 and the opening confirmation wireless tag 12 provided in the storage bag 10 installed in one seat 80, the reader/writer 20 detects that the corresponding storage bag 10 exists in an opened state under the seat 80. Furthermore, when having not been able to communicate with any of the existence confirmation wireless tag 11 and the opening confirmation wireless tag 12 provided in the storage bag 10 installed in one seat 80, the reader/writer 20 detects that the corresponding storage bag 10 does not exist under the seat 80.

As described above in detail, according to the present embodiment, the opening confirmation wireless tag 12 includes the tag antenna 52, the RFID chip 56 electrically connected to the tag antenna 52, and the flame-resistant films 64a and 64b integrally subjecting these to packaging, and a boundary portion between the first portion 12A including the RFID chip 56 and the second portion 12B other than that is cause to be the perforation 70 processed so as to be more easily torn apart than the other portion. Accordingly, in the present embodiment, it may become possible to easily separate the first portion 12A and the second portion 12B from each other (for example, without using a tool such as shears or a cutter). Accordingly, if, in the same way as the present embodiment, the opening confirmation wireless tag 12 is attached to the unopened storage bag 10, when the storage bag 10 is opened, the first portion 12A and the second portion 12B are separated from each other owing to a force applied to the opening confirmation wireless tag 12. In this case, since a very small portion of the tag antenna 52 only remains in the first portion 12A, it may become difficult to perform long-distance communication between the opening confirmation wireless tag 12 and the reader/writer 20. Accordingly, using the reader/writer 20, it may become possible to easily confirm whether the storage bag 10 is opened or unopened, from a long distance. In this case, in checking for all the life jackets (storage bags 10) stored under the seats 80, since a worker may not perform checking in a posture of crawling under the seat 80, the workload of the worker is reduced and it may be possible to effectively perform a check operation.

In addition, in the present embodiment, the cut portions 70A and 70W in the perforation 70 are different in lengths from the end portions of the flame-resistant films 64a and 64b. Accordingly, since it may be possible to avoid a balance between stresses in cut portions adjacent to each other in the horizontal direction when the first portion 12A is torn from the second portion 12B, it may be possible to easily perform the separation of the first portion 12A.

In addition, in the present embodiment, the first portion 12A includes two parallel sides extending from the end portion of the opening confirmation wireless tag 12 in a predetermined direction (the up-and-down direction of FIG. 3A) and has a polygon shape having no side extending in a direction perpendicular to the corresponding predetermined direction. Accordingly, a force in the predetermined direction (the up-and-down direction of FIG. 3A) is applied to the first portion 12A, and hence, it may be possible to easily perform the separation of the first portion 12A in the two sides extending in the predetermined direction. In addition, the shape is adopted that has no side extending in a direction perpendicular to the corresponding predetermined direction, and hence, it may become possible to easily perform the separation of the first portion, which is due to a force in the predetermined direction (the up-and-down direction of FIG. 3A). In addition, since, in the present embodiment, the perforation 70 is not formed in the portion of a strap 54, and hence, it may be possible to avoid the occurrence of a situation where the strap 54 becomes wet through the perforation 70. Accordingly, it may be possible to avoid the deterioration of the opening confirmation wireless tag 12 due to corrosion of the strap 54.

In addition, while, in the above-mentioned embodiment, a case has been described where the perforation 70 is formed in a boundary portion between the first portion 12A and the second portion 12B, the embodiment is not limited to this. For example, from among the flame-resistant films 64a and 64b, the thicknesses of portions between the first portion 12A and the second portion 12B may also be reduced compared with the other portion. In this case, by subjecting the boundary portion to pressure welding or the like, the thicknesses may also be caused to be different. In addition, a perforation may also be formed in a portion of the boundary portion with the thicknesses of the flame-resistant films 64a and 64b in the boundary portion between the first portion 12A and the second portion being caused to be thinner than the other portion. In this case, by being provided in the vicinity of the end portions of the flame-resistant films 64a and 64b (end portions on the upper side of the plane of paper), it may be possible for the perforation to facilitate the separation of the first portion 12A.

In addition, while, in the above-mentioned embodiment, a case has been described where the perforation 70 is formed so as to penetrate the flame-resistant films 64a and 64b and the inlay 60, the embodiment is not limited to this. For example, manufacturing may also be performed so as to cause the flame-resistant films 64a and 64b, in which the perforation 70 has been preliminarily formed, to sandwich therebetween the inlay 60. In this case, no perforation 70 turns out to be formed in the inlay 60.

Figure 10A:
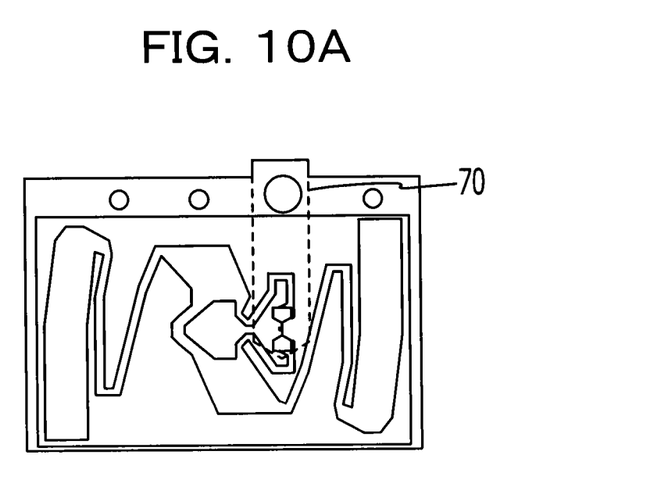
FIG. 10A and FIG. 10B are diagrams for explaining examples of a modification (No. 1).
Figure 10B:
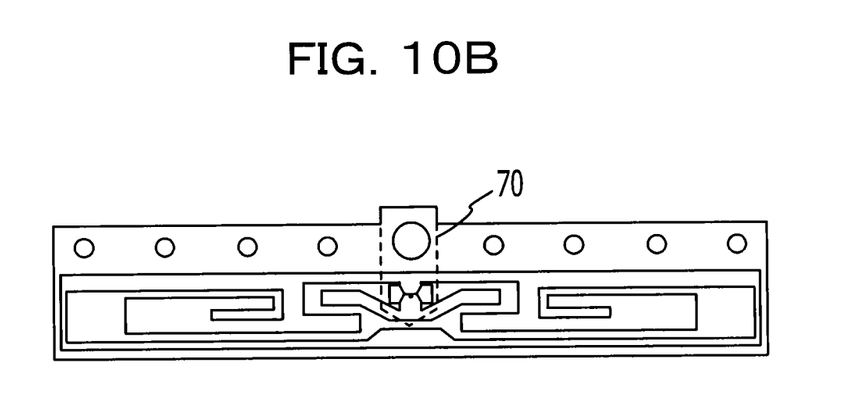

In addition, while, in the above-mentioned embodiment, the wireless tag in FIG. 3A has been cited as an example and described, the embodiment is not limited to this. For example, even if a wireless tag having such an antenna shape as illustrated in FIG. 10A or FIG. 10B is used, a breaking guide portion 70 may be provided.

Figure 11A:
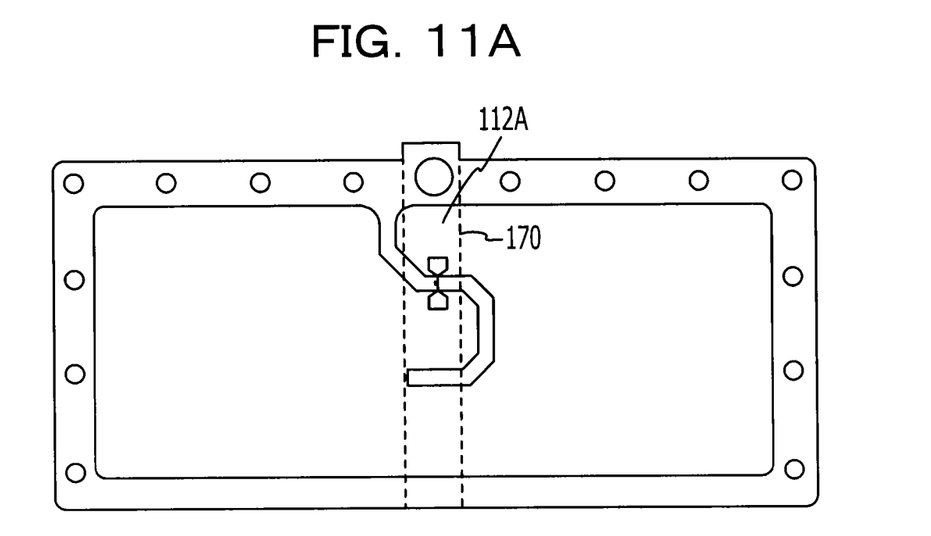
FIG. 11A to FIG. 11C are diagrams for explaining examples of a modification (No. 2).
Figure 11B:
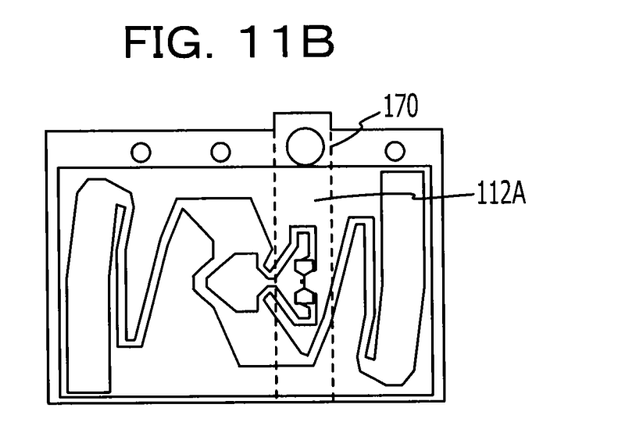
Figure 11C:
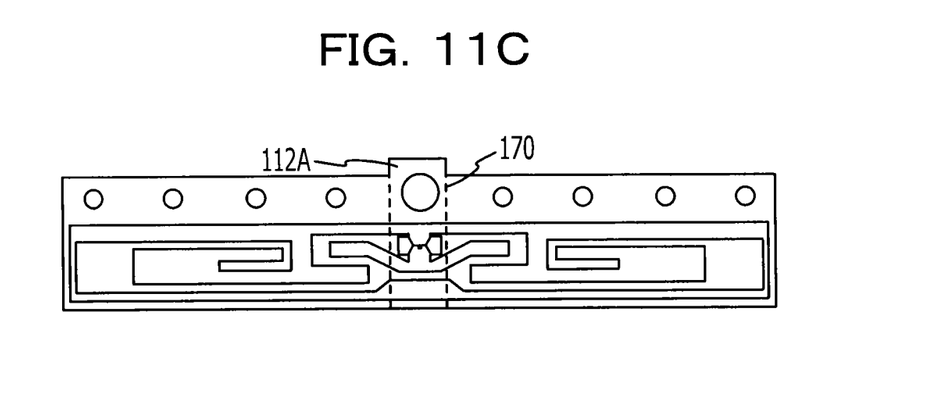

In addition, while, in the above-mentioned embodiment, a case has been described where such a shape as illustrated in FIG. 3A (a pentagonal shape) is adopted, the embodiment is not limited to this. For example, as illustrated in FIG. 11A to FIG. 11C, a band-like (rectangular) shape may also be adopted as the first portion 112A of the shape. Also in this case, since the tag antenna 52 remaining in the first portion 112A becomes very small compared with the state in FIG. 3A, communication performance is reduced.

Figure 12A:
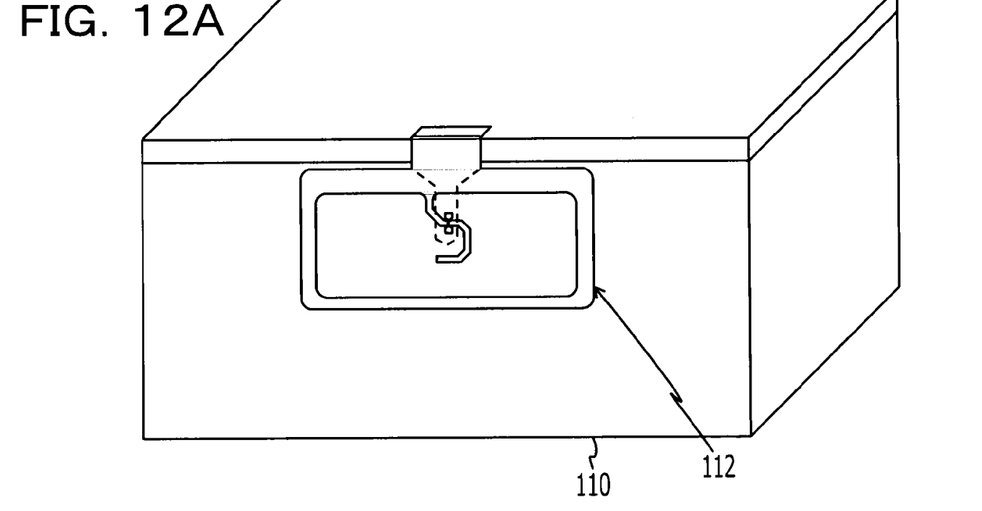
FIG. 12A to FIG. 12C are diagrams for explaining examples of a modification (No. 3).
Figure 12B:
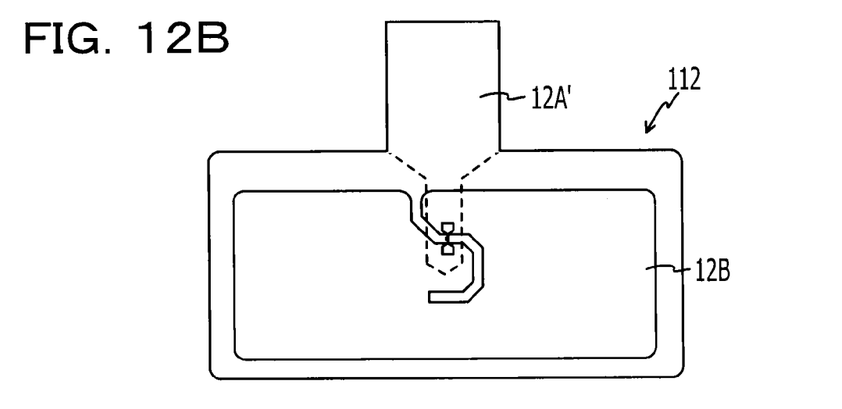
Figure 12C:
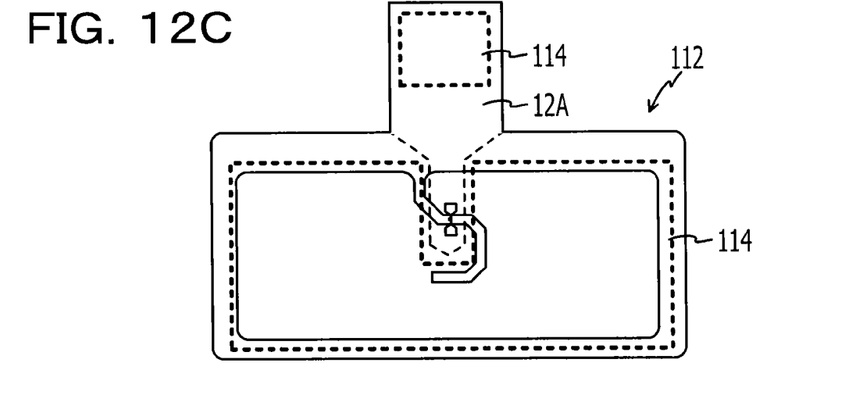

In addition, in the above-mentioned embodiment, such an opening confirmation wireless tag 112 as illustrated in FIG. 12A may also be attached to a medical kit 110 and used for confirming whether or not the medical kit 110 is opened. In this case, as illustrated in FIG. 12B, by forming a portion of a first portion 12A' in the opening confirmation wireless tag 112 into a wide shape, the strength of the first portion 12A' may also be improved. In addition, it is assumed that, as illustrated in FIG. 12C, a double-stick tape or the like is provided in a portion where the opening confirmation wireless tag 112 is in contact with the medical kit 110.

In addition, while, in the embodiment and the examples of a modification, described above, a case has been described where the opening confirmation wireless tag 112 is provided in the storage bag 10 or the medical kit 110, the embodiment is not limited to this. It may also be possible to use the wireless tags of the above-mentioned embodiments for confirming whether another openable object (a bottle, a box, or the like) is opened.

The above-mentioned embodiment is an example of preferred embodiments of the present invention. In this regard, however, the embodiment is not limited to this, and various modifications may be implemented without departing from the scope of the present invention.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless tag comprising:
   an inlay including an integrated circuit formed over a first portion of the inlay, and an antenna formed over the first portion and a second portion of the inlay and electrically connected to the integrated circuit;
   a package encapsulating the inlay and having a flame resistance property; and
   a processed portion formed in the package along a boundary between the first portion and the second portion of the inlay for physically dividing the inlay into the first portion and the second portion.

2. The wireless tag according to claim 1, wherein the processed portion includes a cut section formed in at least an end portion of the package.

3. The wireless tag according to claim 2, wherein the cut section is formed so as to include two cut sections and the two cut sections are basically parallel and different in length from the end portion of the package.

4. The wireless tag according to claim 1, wherein the processed portion is a band-like portion extending from an end portion of the package in a predetermined direction.

5. The wireless tag according to claim 2, wherein the processed portion is a band-like portion extending from an end portion of the package in a predetermined direction.

6. The wireless tag according to claim 3, wherein the processed portion is a band-like portion extending from an end portion of the package in a predetermined direction.

7. The wireless tag according to claim 1, wherein the processed portion has a polygon shape including two parallel sides extending from an end portion of the package to a middle portion of the package in a predetermined direction and at least other two sides extending from each ends of the two parallel sides in a direction which is not perpendicular to the predetermined direction.

8. The wireless tag according to claim 2, wherein the processed portion has a polygon shape including two parallel sides extending from an end portion of the package to a middle portion of the package in a predetermined direction and at least other two sides extending from each ends of the two parallel sides in a direction which is not perpendicular to the predetermined direction.

9. The wireless tag according to claim 3, wherein the processed first portion has a polygon shape including two parallel sides extending from an end portion of the package to a middle portion of the package in a predetermined direction and at least other two sides extending from each ends of the two parallel sides in a direction which is not perpendicular to the predetermined direction.

10. The wireless tag according to claim 1, wherein the processed portion is a perforation.

11. The wireless tag according to claim 1, wherein the processed portion is thinner than other portion of the package.

12. The wireless tag according to claim 1, wherein the processed portion penetrates the processed portion and the inlay.

13. A wireless tag used in an airplane comprising:
an inlay including an integrated circuit formed over a first portion of the inlay and an antenna formed over the first portion and a second portion of the inlay and electrically connected to the integrated circuit;
a package encapsulating the inlay and being suitable for use in the airplane; and
a processed portion formed in the package along a boundary between the first portion and the second portion of the inlay for physically dividing the inlay into the first portion and the second portion; wherein the processed portion has a polygon shape including two parallel sides extending from an end portion of the package to a middle portion of the package in a predetermined direction and at least other two sides extending from each ends of the two parallel sides in a direction which is not perpendicular to the predetermined direction.

14. A wireless tag comprising:
an inlay including an integrated circuit formed over a first portion of the inlay and an antenna formed over the first portion and a second portion of the inlay and electrically connected to the integrated circuit;
a package encapsulating the inlay; and
a processed portion formed in the package along a boundary between the first portion and the second portion of the inlay for physically dividing the inlay into the first portion and the second portion, wherein
the processed portion extends from an end portion of the package to a middle portion of the package, having a polygon shape including two parallel sides extending from the end portion of the package to the middle portion of the package in a predetermined direction and at least other two sides extending from each ends of the two parallel sides in a direction which is not perpendicular to the predetermined direction.

* * * * *